United States Patent
Gulle et al.

(10) Patent No.: US 12,472,237 B2
(45) Date of Patent: Nov. 18, 2025

(54) FIBRINOGEN AND THROMBIN SOLUTIONS FOR A FIBRIN SEALANT AND FIBRIN SEALANT KIT

(71) Applicants: BAXTER INTERNATIONAL INC., Deerfield, IL (US); BAXTER HEALTHCARE SA, Glattpark (CH); LEUKOCARE AG, Martinsried/Munich (DE)

(72) Inventors: Heinz Gulle, Gross Enzersdorf (AT); Rahul Kumar Singh, Milwaukee, WI (US); Julia Rabas, Hurlach (DE); Eva Reinauer, Eurasburg (DE); Stella Grosso, Martinsried (DE)

(73) Assignees: BAXTER INTERNATIONAL INC., Deerfield, IL (US); BAXTER HEALTHCARE SA, Glattpark (CH); LEUKOCARE AG, Martinsried/Munich (DE)

( * ) Notice: Subject to any disclaimer, the term of this patent is extended or adjusted under 35 U.S.C. 154(b) by 0 days.

(21) Appl. No.: 18/078,213

(22) Filed: Dec. 9, 2022

(65) Prior Publication Data

US 2023/0210958 A1  Jul. 6, 2023

Related U.S. Application Data (60) Provisional application No. 63/266,239, filed on Dec. 30, 2021.

(51) Int. Cl.
| | |
|---|---|
| A61L 24/10 | (2006.01) |
| A61K 31/155 | (2006.01) |
| A61K 31/4172 | (2006.01) |
| A61K 31/724 | (2006.01) |
| A61K 38/36 | (2006.01) |
| A61K 38/48 | (2006.01) |
| A61P 17/02 | (2006.01) |

(52) U.S. Cl.
CPC .......... *A61K 38/363* (2013.01); *A61K 31/155* (2013.01); *A61K 31/4172* (2013.01); *A61K 31/724* (2013.01); *A61K 38/4833* (2013.01); *A61P 17/02* (2018.01)

(58) Field of Classification Search
CPC ................ A61K 38/363; A61K 31/155; A61K 31/4172; A61K 31/724; A61K 38/4833; A61P 17/02; A61L 2300/106; A61L 2300/214; A61L 2300/232; A61L 24/108; A61L 24/106
See application file for complete search history.

(56) References Cited

U.S. PATENT DOCUMENTS

| | | | |
|---|---|---|---|
| 3,849,252 A | 11/1974 | Percs et al. | |
| 4,297,344 A | 10/1981 | Schwinn et al. | |
| 7,351,561 B2 | 4/2008 | Metzner et al. | |
| 8,383,104 B2 | 2/2013 | Chtourou | |
| 9,598,461 B2 | 3/2017 | Pham et al. | |
| 9,775,884 B2 | 10/2017 | Miyagawa et al. | |
| 9,814,765 B2 | 11/2017 | Pilpel et al. | |
| 10,131,896 B2 | 11/2018 | Orr et al. | |
| 2005/0118156 A1 | 6/2005 | Woolverton | |
| 2008/0181878 A1 | 7/2008 | Farrell | |
| 2008/0260714 A1 | 10/2008 | Barry et al. | |
| 2008/0311190 A1 | 12/2008 | Chtourou | |
| 2010/0119563 A1 | 5/2010 | Miyagawa et al. | |
| 2013/0149292 A1 | 6/2013 | Chtourou | |
| 2014/0154233 A1 | 6/2014 | Pham et al. | |
| 2014/0328822 A1 | 11/2014 | Kim et al. | |
| 2015/0151020 A1 | 6/2015 | Kageyama et al. | |
| 2015/0158906 A1 | 6/2015 | Pham et al. | |
| 2015/0174215 A1 | 6/2015 | Pilpel et al. | |
| 2015/0328291 A1 | 11/2015 | Chtourou | |
| 2015/0328362 A1 | 11/2015 | Chtourou | |
| 2016/0015792 A1 | 1/2016 | Hendricus van Pinxteren et al. | |
| 2019/0209948 A1 | 7/2019 | Pham et al. | |
| 2019/0231855 A1 | 8/2019 | Dockal et al. | |
| 2019/0269764 A1 | 9/2019 | Hendricus van Pinxteren et al. | |

FOREIGN PATENT DOCUMENTS

| | | |
|---|---|---|
| EP | 142059 | 5/1985 |
| EP | 2130549 A1 | 12/2009 |
| EP | 2142224 A2 | 1/2010 |
| EP | 2130549 B1 | 7/2014 |
| EP | 2823829 A1 | 1/2015 |
| EP | 2851095 | 3/2015 |
| EP | 2928905 | 10/2015 |
| EP | 2964252 | 1/2016 |

(Continued)

OTHER PUBLICATIONS

Katdare et al. Chapter 17 Excipients for Drug Delivery, in Excipient Development for Pharmaceutical, Biotechnology, and Drug Delivery Systems, 2006, Taylor and Francis, New York, pp. 295-337 (Year: 2006).*

(Continued)

*Primary Examiner* — Lianko G Garyu
*Assistant Examiner* — Kristina M Hellman
(74) *Attorney, Agent, or Firm* — K&L Gates LLP (57) ABSTRACT

Disclosed are a fibrinogen solution and a thrombin solution. The fibrinogen solution comprises fibrinogen at a concentration of at least 40 mg/ml, factor XIII, pharmaceutically acceptable additives and water. The dynamic viscosity of the fibrinogen solution measured at 20° C. increases at most by 35% after storing the solution at 20° C. for 30 days. The thrombin solution comprises thrombin, pharmaceutically acceptable additives and water. The thrombin activity decreases at most by 15% after storing the solution at 25° C. for 14 days. Also disclosed is a fibrin sealant kit with a first container comprising the fibrinogen solution and a second container comprising the thrombin solution. Further, methods for preparing a fibrin sealant and methods for treating a wound are disclosed.

15 Claims, 6 Drawing Sheets

(56) References Cited

FOREIGN PATENT DOCUMENTS

| | | |
|---|---|---|
| EP | 2142224 B1 | 3/2016 |
| EP | 2823829 B1 | 7/2016 |
| EP | 3086817 | 11/2016 |
| EP | 1968626 | 5/2018 |
| EP | 3483173 | 5/2019 |
| WO | 2008117746 | 10/2008 |
| WO | 2008131154 | 10/2008 |
| WO | 2013172472 | 11/2013 |
| WO | 2014085861 | 6/2014 |
| WO | 2014135689 | 9/2014 |
| WO | 2015097687 | 7/2015 |
| WO | 2016065360 | 4/2016 |

OTHER PUBLICATIONS

Chi et al. Excipients and their Effects on the Quantity of Biologics, 2012, pp. 1-9 (Year: 2012).*
Saokham et al. Solubility of Cyclodextrins and Drug/Cyclodextrin Complexes, 2018, Molecules, 23: 1161-1176 (Year: 2018).*
Zhao et al. ((eds) Handbook of Macrocyclic Supramolecular Assembly . Springer, Singapore, 2019, pp. 1-26 (Year: 2019).*
Weigandt et al. Fibrin Clot Structure and Mechanics Associated with Specific Oxidation of Methionine Residues in Fibrinogen, 2012, Biophysical Journal, 103: 2399-2407 (Year: 2012).*
Ye et al. Alanine Enhances Aminoglycosides-Induced ROS Production as Revealed by Proteomic Analysis, 2018, Frontiers in Microbiology, 9(29): 1-14 (Year: 2018).*
Tisseel package insert, Baxter, accessed Dec. 22, 2024 at URL fda.gov/media/71674/download (2013), 8 pages (Year: 2013).*
Evicel fibrin sealant, FDA package insert, accessed Dec. 22, 2024 at URL fda.gov/media/81499/download (2003), 19 pages (Year: 2003).*
International Preliminary Report on Patentability for App. No. PCT/US2022/081263 dated Jul. 11, 2024 (9 pages).
International Search Report and Written Opinion for App. No. PCT/US2022/081263 dated Apr. 3, 2023 (26 pages).

* cited by examiner

Table 5: Thrombin Formulations - Additives

| Unit | Sample No.<br>Excipients | T_WP6_0F | T_WP6_01<br>100mM GUA<br>7.5mM Cyclo | T_WP6_02<br>T_WP5_10<br>modified<br>50mM GUA<br>25mM Cyclo | T_WP6_03<br>50 mM GUA<br>12.5 mM<br>Cyclo | T_WP6_04<br>25mM GUA<br>25mM Cyclo | T_WP6_05<br>25 mM Gua<br>12.5 mM<br>Cyclo |
|---|---|---|---|---|---|---|---|
| g/l | Ala | | | | | | |
| g/l | Gly | | 15 | 15 | 15 | 15 | 15 |
| g/l | His | | 3.1 | 3.1 | 3.1 | 3.1 | 3.1 |
| g/l | Met | | 1.5 | 1.5 | 1.5 | 1.5 | 1.5 |
| g/l | Guanidin-HCl | | 9.6 | 4.8 | 4.8 | 2.4 | 2.4 |
| g/l | Trehalose | | | | | | |
| g/l | Kleptose HBP | | 8.6875 | 34.75 | 17.375 | 34.75 | 17.375 |
| g/l | Captisol | | | | | | |
| pH | | 6.86 | 7.1 | 7.1 | 7.1 | 7.1 | 7.1 |

FIG. 3B

Table 5: Thrombin Formulations - Additives - Continued

| Unit | Sample No. Excipients | T_WP6_06 25 mM Gua 7.5 mM Cyclo | T_WP6_07 50 mM Gua 25 mM Captisol | T_WP6_08 525 mM Gua 12.5 mM Captisol | T_WP6_09 50 mM GUA 12.5 mM Cyclo | T_WP06_10 25 mM Gua 12.5 mM Cyclo |
|---|---|---|---|---|---|---|
| g/l | Ala | | | | | 7.5 |
| g/l | Gly | 15 | 15 | 15 | | 7.5 |
| g/l | His | 3.1 | 3.1 | 3.1 | 3.1 | 3.1 |
| g/l | Met | 1.5 | 1.5 | 1.5 | | 1.5 |
| g/l | Guanidin-HCl | 2.4 | 2.4 | 4.8 | 4.8 | 2.4 |
| g/l | Trehalose | | | | 18.92 | |
| g/l | Kleptose HBP | 8.6875 | | | 17.375 | 17.375 |
| g/l | Captisol | | 54.08 | 27.04 | | |
| pH | | 7.1 | 7.1 | 7.1 | 7.1 | 7.1 |

FIG. 4A

Table 6: Thrombin Activity After Storage

| Thrombin activity normalized to 0d [%] | T_WP6_0F | T_WP6_01 | T_WP6_02 | T_WP6_03 | T_WP6_04 | T_WP6_05 |
|---|---|---|---|---|---|---|
| 0°C | 100.0 | 100.0 | 100.0 | 100.0 | 100.0 | 100.0 |
| 42d 15°C | 86.1 | 94.0 | 94.6 | 96.1 | 97.3 | 93.8 |
| 14d 25°C | 80.9 | 93.4 | 95.0 | 94.5 | 98.2 | 90.1 |
| 28d 25°C | 70.4 | 86.6 | 88.0 | 88.0 | 88.4 | 82.8 |
| 35d 25°C | 66.4 | 87.7 | 86.8 | 84.8 | 86.1 | 79.9 |
| 42d 25°C | 62.9 | 82.8 | 84.6 | 80.4 | 84.0 | 74.4 |
| 14d 30°C | 64.6 | 88.1 | 86.0 | 81.8 | 86.1 | 76.5 |
| 28d 30°C | 48.2 | 79.3 | 79.9 | 76.2 | 77.5 | 68.8 |
| 35d 30°C | 43.1 | 76.3 | 76.7 | 69.7 | 72.3 | 64.0 |
| 42d 30°C | 35.4 | 69.8 | 69.1 | 66.3 | 68.7 | 56.3 |
| 7d 37°C | 40.3 | 76.5 | 78.7 | 74.3 | 72.0 | 65.2 |
| 14d 37°C | 13.7 | 55.7 | 57.9 | 50.6 | 50.4 | 37.7 |

FIG. 4B

Table 6: Thrombin Activity After Storage - Continued

| Thrombin activity normalized to 0d [%] | T_WP6_06 | T_WP6_07 | T_WP6_08 | T_WP6_09 | T_WP6_10 |
|---|---|---|---|---|---|
| 0°C | 100.0 | 100.0 | 100.0 | 100.0 | 100.0 |
| 42d 15°C | 91.9 | 99.0 | 95.9 | 92.1 | 91.2 |
| 14d 25°C | 89.9 | 93.6 | 95.4 | 89.1 | 87.7 |
| 28d 25°C | 79.1 | 89.6 | 86.8 | 83.3 | 81.1 |
| 35d 25°C | 74.4 | 92.8 | 87.2 | 82.2 | 76.0 |
| 42d 25°C | 72.4 | 86.0 | 81.7 | 77.8 | 74.9 |
| 14d 30°C | 73.2 | 85.6 | 85.5 | 78.2 | 77.6 |
| 28d 30°C | 64.6 | 82.0 | 75.5 | 72.2 | 66.2 |
| 35d 30°C | 60.4 | 79.4 | 71.3 | 65.3 | 62.5 |
| 42d 30°C | 51.8 | 74.1 | 62.7 | 58.0 | 54.2 |
| 7d 37°C | 60.9 | 88.9 | 81.1 | 66.8 | 66.8 |
| 14d 37°C | 32.2 | 78.6 | 70.2 | 43.7 | 42.9 |

FIBRINOGEN AND THROMBIN SOLUTIONS FOR A FIBRIN SEALANT AND FIBRIN SEALANT KIT

CROSS-REFERENCE TO RELATED APPLICATIONS

The present application claims priority to U.S. Patent Application No. 63/266,239, filed on Dec. 30, 2021, the disclosure of which is incorporated herein by reference for all purposes.

FIELD OF THE INVENTION

The technical field relates to fibrinogen solutions and thrombin solutions as well as to fibrin sealant kits comprising these solutions in separate containers.

TECHNICAL BACKGROUND

Tissue adhesives based on fibrinogen (fibrin sealants) are commonly employed for seamless and/or seam-supporting binding of human or animal tissue or organ parts, for wound sealing, hemostasis and promoting wound healing. Their mode of action is based on the fact that the (soluble) fibrinogen contained in a ready-to-use, liquid tissue adhesive is converted by thrombin into (insoluble) fibrin. Factor XIII may also be included in the liquid tissue adhesive, where it is activated to Factor XIIIa, by the action of thrombin. This crosslinks the formed fibrin to form a high molecular weight polymer which may improve the effectiveness of the tissue adhesive. The required thrombin activity can either originate from the tissue (the wound surface) to be adhered or can be added in the form of a thrombin and Ca2+ ion-containing solution to the tissue adhesive in the course of the sealing. Tissue adhesives based on fibrinogen are known from U.S. Pat. Nos. 4,377,572 A, 4,298,598 A, 4,414,976 A, 4,362,567 A, and GB 2 102 811 B. Aside from fibrinogen and Factor XIII they may also contain further proteins such as fibronectin and albumin, protease inhibitors such as aprotinin, and optionally antibiotic agents, growth factors, analgesics, etc. U.S. Pat. No. 5,962,405 A discloses storage-stable fibrinogen preparations in lyophilized form or a form resulting from deep-freezing liquid preparations (deep-frozen) which can be reconstituted and liquefied quickly and in a simple manner to form ready-to-use fibrinogen and/or tissue adhesive solutions. Such preparations are marketed as TISSEEL® Fibrin Sealant by Baxter Healthcare Corporation (USA).

Typically, fibrin sealants are obtained by mixing at least two components immediately before application to the wound: the sealer protein component (with fibrinogen as the most important ingredient) and the thrombin component. The conversion of fibrinogen to fibrin starts immediately after mixing the components.

TISSEEL® is presently commercially available in two different presentations; TISSEEL® Kit (Freeze Dried) and TISSEEL® Pre-filled Syringe (Frozen). TISSEEL® (Frozen) comprises a double-chamber syringe, pre-filled with Sealer Protein Solution and Thrombin Solution, that is thawed before use and then applied using the application device(s) supplied with the product. It is available in 2, 4, and 10 ml pack sizes.

TISSEEL® Pre-filled Syringe (Frozen) is stored at or below −20° C. and must be thawed and warmed to 33-37° C. prior to use. The thawing at room temperature (15 to 25° C.) can take 60 to 160 minutes depending on the syringe and size with an additional 2 to 52 minutes to warm depending on the syringe, packaging, size, and heat source. Combining thawing and warming, the product can take from 5 to 105 minutes depending on the syringe, packaging, size, and heat source to prepare. If the syringe is thawed at 15 to 25° C. it must be warmed and used within 48 hours and once warmed at 33-37° C., it must be used within 4 hours.

These thawing and warming times require that surgical teams carefully plan each step involved in preparing TISSEEL®: removal from −20° C., transport to the operating room, thawing time at 15 to 25° C., removal of packaging, and warming (and thawing) time to 33-37° C. Further the availability of the warmed product must match the step of the surgical procedure due to the 4-hour warmed shelf-life, and once warmed, unused, unopened fibrin sealant must be discarded. Accordingly, there is an unmet need for fibrin sealants with improved usability (in particular with regard to usage timing flexibility) and for reduced waste of fibrinogen (which is a scarce human-donated material in case of the presently commercially available fibrin sealants).

It is thus an object of the present invention to provide improved fibrin sealant components, i.e. fibrinogen and thrombin formulations, which are more stable at room temperature in liquid form and/or which can be used by the surgeon with a reduced need for preparation steps (in particular without thawing of frozen and/or dissolution of lyophilized components, and/or with reduced need for warming at 33-37° C. before use).

SUMMARY OF THE INVENTION

The present invention provides a fibrinogen solution (for preparing a fibrin sealant) comprising fibrinogen at a concentration of at least 40 mg/ml, factor XIII, pharmaceutically acceptable additives and water. Typically, the dynamic viscosity of this solution measured at 20° C. increases at most by 35% after storing the solution at 20° C. for 30 days; preferably, the dynamic viscosity of the solution measured at 20° C. increases at most by 30%, preferably at most by 25%, more preferably at most by 20%, even more preferably at most by 15%, especially at most by 10% after storing the solution at 20° C. for 30 days. In addition, or alternatively thereto, it is preferred that (immediately after thawing, i.e. before storing the solution in a liquid state e.g. for up to 30 days) the dynamic viscosity of the solution measured at 20° C. is less than 120 mPa·s, preferably less than 110 mPa·s, more preferably less than 105 mPa·s, especially less than 100 mPa·s.

The present invention further relates to a thrombin solution (for preparing a fibrin sealant), comprising thrombin, pharmaceutically acceptable additives and water. Typically, the thrombin activity of this solution decreases at most by 15%, preferably at most by 12.5%, more preferably at most by 10%, even more preferably at most by 7.5%, especially at most by 5% after storing the solution at 25° C. for 14 days. Alternatively, or in addition thereto, it is preferred that: the thrombin activity decreases at most by 25%, preferably at most by 20%, more preferably at most by 15% after storing the solution at 25° C. for 28 days, or that the thrombin activity decreases at most by 30%, preferably at most by 25%, more preferably at most by 20%, even more preferably at most by 15% after storing the solution at 25° C. for 35 days or that the thrombin activity decreases at most by 35%, preferably at most by 30%, more preferably at most by 25%, even more preferably at most by 20% after storing the solution at 25° C. for 42 days; or that the thrombin activity decreases at most by 10%, preferably at most by 7.5% after storing the solution at 15° C. for 42 days; or that the thrombin activity decreases at most by 35%, preferably at most by 30%, more preferably at most by 25%, even more preferably at most by 20%, especially at most by 15% after storing the solution at 30° C. for 14 days, or that the thrombin activity decreases at most by 50%, preferably at most by 45%, more preferably at most by 40%, even more preferably at most by 35%, especially at most by 30% or even at most by 25% after storing the solution at 30° C. for 28 days, or that the thrombin activity decreases at most by 55%, preferably at most by 50%, more preferably at most by 45%, even more preferably at most by 40%, especially at most by 35% or even at most by 30% after storing the solution at 30° C. for 35 days or that the thrombin activity decreases at most by 60%, preferably at most by 55%, more preferably at most by 50%, even more preferably at most by 45%, especially at most by 40% or even at most by 35% after storing the solution at 30° C. for 42 days; or that the thrombin activity decreases at most by 55%, preferably at most by 50%, more preferably at most by 45%, even more preferably at most by 40%, especially at most by 35% or even at most by 30% after storing the solution at 37° C. for 7 days, or that the thrombin activity decreases at most by 85%, preferably at most by 80%, more preferably at most by 75%, even more preferably at most by 70%, especially at most by 65% or even at most by 60% or at most by 55% after storing the solution at 37° C. for 14 days.

In an aspect of the present invention, a fibrin sealant kit, comprising at least a first container comprising a fibrinogen solution, and a second container comprising a thrombin solution, is provided. The fibrinogen solution is defined as set forth herein and/or the thrombin solution is defined as set forth herein.

In another aspect, the present invention relates to a method for preparing a fibrin sealant, comprising the steps of obtaining a fibrin sealant kit as defined herein, wherein the fibrinogen solution and the thrombin solution are in a frozen state, thawing the fibrinogen solution and the thrombin solution, storing the fibrinogen solution and the thrombin solution at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, (e.g. for up to 30 days or for up to 42 days or for up to 50 days) and, after the storing, combining (e.g. mixing) the fibrinogen solution and the thrombin solution to obtain the fibrin sealant.

The present invention also relates to a method for preparing a fibrin sealant, comprising the steps of obtaining a fibrin sealant kit as defined herein, wherein the fibrinogen solution and the thrombin solution are in a frozen state, thawing the fibrinogen solution in the first container and the thrombin solution in the second container, storing the fibrinogen solution in the first container and the thrombin solution in the second container at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, (e.g. for up to 30 days or for up to 42 days or for up to 50 days) and, after the storing, opening the sterile package containing the first container and/or the second container, after the opening, combining (e.g. mixing) the fibrinogen solution and the thrombin solution to obtain the fibrin sealant.

Yet another aspect of the present invention relates to a method for preparing a fibrin sealant, comprising the steps of obtaining a first container comprising a lyophilized formulation comprising fibrinogen, factor XIII and pharmaceutically acceptable additives, and a second container comprising a lyophilized formulation comprising thrombin and pharmaceutically acceptable additives, reconstituting, by adding water or an aqueous solution, the formulation of the first container to obtain the fibrinogen solution as set forth herein, and the formulation of the second container to obtain the thrombin solution as set forth herein, storing the fibrinogen solution and the thrombin solution at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, (e.g. for up to 30 days or for up to 42 days or for up to 50 days) and, after the storing, combining the fibrinogen solution and the thrombin solution to obtain the fibrin sealant.

In yet another aspect, a method for treating a wound, especially a bleeding wound, or tissue comprising the step of applying a fibrin sealant obtained by a method disclosed herein to the wound or tissue, is provided.

Further, the present invention provides a method for treating a wound, especially a bleeding wound, or tissue comprising the steps of combining (e.g. mixing) a fibrinogen solution and a thrombin solution to obtain a fibrin sealant, wherein the fibrinogen solution is defined as set forth herein and/or wherein the thrombin solution is defined as set forth herein, and applying the fibrin sealant to the wound or tissue.

Finally, in yet another aspect, the present invention provides the fibrinogen solution disclosed herein and/or the thrombin solution disclosed herein for use in a method as disclosed herein.

In the course of the present invention, it was found that storing fibrinogen solutions of the prior art (e.g. as marketed under TISSEEL®) at non-refrigerated temperatures (e.g. room temperature) for up to 30 days lead to a viscosity increase which made subsequent handling steps more difficult. Accordingly, a screen for pharmaceutically acceptable additives at various concentrations was performed to find additives which reduce this viscosity increase, while maintaining other beneficial properties (such as being able to form an opaque clot when combined with the thrombin solution). The present invention, inter alia, relates to fibrinogen solutions with additives found in this screen. In particular, guanidine and arginine turned out to be very suitable additives, even at low concentrations.

Further, a screen for pharmaceutically acceptable additives at various concentrations was performed in order to find additives which increase stability of the thrombin solution (i.e. reduce thrombin activity loss) at non-refrigerated temperatures (e.g. room temperature), while maintaining other beneficial properties and having high compatibility with the fibrinogen solutions developed in the course of the present invention. The present invention, inter alia, relates to thrombin solutions with additives found in this screen. In particular, guanidine and cyclodextrins turned out to be very suitable additives, even at low concentrations.

DETAILED DESCRIPTION

Viscosity of fibrinogen solutions was discussed in the prior art, for instance in U.S. Pat. No. 6,447,774 B1 which relates to stabilized protein preparations for a tissue adhesive. However, apparently no efforts were made to optimize the fibrinogen solution for longer-term storage at elevated temperatures (i.e. non-refrigerated). Accordingly, the authors of U.S. Pat. No. 6,447,774 B1 could not observe that a dynamic viscosity increase was a problem also for prolonged storage at higher temperatures (under which dynamic viscosity of fibrinogen solutions is considerably lower, in general). Furthermore, it was suggested in the document to provide factor XIII as a separate component to increase stability of the fibrinogen solution. By contrast, it turned out in the course of the present invention that factor XIII can remain as a component in the fibrinogen solution and a room-temperature stable fibrinogen solution with excellent handling properties could nevertheless be achieved.

JP 2000229882 A relates to stabilization of aqueous solutions of thrombin. Cyclodextrin is disclosed as a stabilizer. However, stability tests are performed only at 5° C. The document is silent with respect to stability of thrombin solutions at elevated temperatures such as room temperature.

Previous attempts to stabilize thrombin have also focused on reversibly inhibiting thrombin through pH [Fenton et al., J. Biol. Chem. 252 (11) 3587-3598. 1977], arginine or ammonium compounds [Laurent et al., Bioorganic & Medicinal Chemistry. 3 (8) 1145-1156. 1995], or pharmacologic agents [U.S. Pat. Nos. 10,131,896; 7,351,561; Markwardt et al., European J. Biochem. 6 (1968) 502-506. 1968]. EP 1649867A1 discloses a composition comprising purified thrombin, human albumin and a neutral salt, the resulting product being stored either lyophilised or frozen.

U.S. 2019/0209948 discloses a vessel containing a pharmaceutical formulation comprising a fibrinogen solution and an effective amount of a stabilizer such as amino acids of proline, glycine, or arginine. Furthermore, EP 3483173A1 discloses a vessel containing at least 5 mL of a stable pharmaceutically acceptable fibrinogen solution, wherein the concentration of fibrinogen is at least 20 mg/mL.

U.S. 2005/0197493 discloses formulations of fibrinogen with arginine. U.S. 2005/0197493 is silent on the fibrinogen concentration in its formulations.

U.S. 2019/0269764 discloses sterile powder compositions comprising thrombin and fibrinogen, wherein the thrombin and fibrinogen powders are produced from liquid feedstocks.

US 2016/0074515 A1 relates to viscosity-reducing excipient compounds for protein formulations in general. Thrombin is merely listed as one of many proteins.

EP 1649867A1 discloses a composition comprising purified thrombin, human albumin and a neutral salt, the resulting product being stored either lyophilised or frozen.

The present invention provides a fibrinogen solution (for preparing a fibrin sealant) comprising (preferably human) fibrinogen at a concentration of at least 40 mg/ml, factor XIII, pharmaceutically acceptable additives and water. It is preferred that the dynamic viscosity of this solution measured at 20° C. increases at most by 35% after storing the solution at 20° C. for 30 days; preferably, the dynamic viscosity of the solution measured at 20° C. increases at most by 30%, preferably at most by 25%, more preferably at most by 20%, even more preferably at most by 15%, especially at most by 10% after storing the solution at 20° C. for 30 days. In addition, or alternatively thereto, it is preferred that (immediately after (first) thawing, i.e. before storing the solution in a liquid state e.g. for up to 30 days) the dynamic viscosity of the solution measured at 20° C. is less than 120 mPa·s, preferably less than 110 mPa·s, more preferably less than 105 mPa·s, especially less than 100 mPa·s. The preferred method of measuring dynamic viscosity is by falling ball viscometer (preferably with a 1.8 mm glass capillary).

Typical fibrinogen concentrations suitable for the present invention range between 40 mg/ml and 150 mg/ml (preferably human) fibrinogen. Preferably, the fibrinogen solution comprises fibrinogen at a concentration of at least 50 mg/ml, preferably at least 60 mg/ml, especially at least 65 mg/ml. In particular, the solution comprises fibrinogen at a concentration of at most 150 mg/ml, preferably at most 140 mg/ml, even more preferably at most 130 mg/ml, yet even more preferably at most 120 mg/ml, especially at most 110 mg/ml.

Suitable fibrinogen solutions and methods of making them are described e.g. in U.S. Pat. No. 5,962,405. The fibrinogen solution may optionally further contain factor XIII, and e.g. optionally fibronectin or small amounts of plasminogen which can be advantageous in the course of wound healing. A plasminogen activator inhibitor and plasmin inhibitor may also optionally be included, such as aprotinin, a2-plasmin inhibitor, a2-macroglobulin and the like. Fibrinogen solutions typically do not contain free calcium ions, as these might cause activation of residual traces of prothrombin and hence premature, unwanted clotting. Typically, a calcium chelating agent is included in tissue adhesive solutions to complex residual calcium ions. Preferably, citrate is included as such an agent in the form of a physiologically acceptable salt, such as tri-sodium citrate.

Typical factor XIII concentrations suitable for the present invention range are at least 0.1 international units (IU)/ml, preferably at least 0.25 IU/ml, more preferably at least 0.5 IU/ml, even more preferably at least 1 IU/ml, yet even more preferably at least 2 IU/ml, especially at least 3 IU/ml.

Aprotinin is a preferred further component in the inventive fibrinogen solution. Thus, according to a preferred embodiment, the solution further comprises aprotinin, preferably at a concentration of at least 250 kallidinogenase inactivator units (KIU)/ml, preferably at least 500 KIU/ml, more preferably at least 750 KIU/ml, even more preferably at least 1000 KIU/ml, yet even more preferably at least 1500 KIU/ml, especially at least 2000 KIU/ml or even at least 2250 KIU/ml. It is however preferred that the concentration is at most 10000 KIU/ml, preferably at most 7500 KIU/ml, more preferably at most 5000 KIU/ml, especially at most 4000 KIU/ml.

In the course of the present invention, guanidine turned out as one of the additives which reduced the viscosity increase caused by prolonged non-refrigerated storage. Thus, according to a preferred embodiment, the pharmaceutically acceptable additives of the solution comprise guanidine (e.g. guanidine-HCl). Preferably, the guanidine concentration in the solution is more than 3 mM, preferably more than 5 mM or even more than 10 mM, more preferably more than 12 mM, even more preferably more than 14 mM, especially more than 16 mM. It was found that, under certain circumstances, higher guanidine concentrations lead to suboptimal clot formation. Accordingly, it is preferred that the guanidine concentration in the solution is less than 200 mM, preferably less than 100 mM, more preferably less than 50 mM, even more preferably less than 40 mM, yet even more preferably less than 35 mM, especially less than 30 mM.

Arginine also turned out as one of the additives which reduced the viscosity increase caused by prolonged non-refrigerated storage. Therefore, in another preferred embodiment, the pharmaceutically acceptable additives comprise arginine. Preferably, the arginine concentration in the solution is more than 0.5 mM, preferably more than 1.0 mM, more preferably more than 2.0 mM, even more preferably more than 2.5 mM, especially more than 3.0 mM or even more than 3.5 mM. However, the inventors found that, under certain circumstances, higher arginine concentrations lead to suboptimal clot formation. Accordingly, it is preferred that the arginine concentration in the solution is less than 90 mM, preferably less than 70 mM, more preferably less than 50 mM, even more preferably less than 40 mM, yet even more preferably less than 30 mM, especially less than 20 mM or even less than 15 mM.

It turned out that guanidine and arginine acted synergistically in reducing the viscosity increase caused by prolonged non-refrigerated storage of the fibrinogen solution. In yet another preferred embodiment, the pharmaceutically acceptable additives hence comprise both guanidine and arginine. Preferably, the sum of the guanidine concentration and the arginine concentration in the solution is more than 5 mM, preferably more than 10 mM, more preferably more than 15 mM, especially more than 20 mM. To avoid potential detrimental effects on clot formation, it is preferred that the sum is less than 200 mM, preferably less than 100 mM, more preferably less than 50 mM, even more preferably less than 40 mM, especially less than 30 mM.

In yet another preferred embodiment, the pharmaceutically acceptable additives comprise sodium chloride (which also turned out to have a beneficial effect on stability and viscosity). Preferably, the sodium chloride concentration in the solution is more than 10 mM, preferably more than 20 mM, more preferably more than 30 mM, even more preferably more than 40 mM, especially more than 50 mM. It is however beneficial for clot formation if the sodium chloride concentration in the solution is less than 200 mM, preferably less than 100 mM, more preferably less than 80 mM, even more preferably less than 70 mM, yet even more preferably less than 65 mM, especially less than 60 mM.

Another additive with beneficial effect on stability during prolonged non-refrigerated storage turned out to be histidine. Thus, in another preferred embodiment, the pharmaceutically acceptable additives of the fibrinogen solution comprise histidine. Preferably, the histidine concentration in the solution is more than 25 mM, preferably more than 50 mM, more preferably more than 75 mM, even more preferably more than 100 mM, especially more than 125 mM. To avoid potential detrimental effects on clot formation, it is preferred that the histidine concentration in the solution is less than 250 mM, preferably less than 225 mM, more preferably less than 200 mM, even more preferably less than 175 mM, especially less than 150 mM.

In the course of the present invention, fibrinogen solutions within a broad range of osmolalities were tested and the most suitable ranges were found. Thus, in a preferred embodiment, the osmolality of the solution is more than 300 mOsmol/kg, preferably more than 350 mOsmol/kg, more preferably more than 400 mOsmol/kg, even more preferably more than 425 mOsmol/kg, especially more than 450 mOsmol/kg. It is however preferred when the osmolality of the solution is less than 800 mOsmol/kg, preferably less than 700 mOsmol/kg, more preferably less than 600 mOsmol/kg, especially less than 500 mOsmol/kg. Osmolality is preferably measured immediately after (first) thawing, i.e. before storing the solution in a liquid state e.g. for up to 30 days. The preferred method for measuring osmolality is by freezing point depression in an osmometer (e.g. Osmomat 030-D RS, Gonotec).

Further additives may be added to the inventive fibrinogen solution. For instance, the pharmaceutically acceptable additives may comprise at least one of, preferably at least two of, more preferably at least three of, especially all of: albumin (in particular human serum albumin), citrate, surfactant and nicotinamide.

The surfactant may for instance be one of the tensides disclosed in U.S. Pat. No. 4,909,251, e.g. at the concentrations disclosed therein. Preferably, the surfactant is selected from the group of the non-ionic, cationic, anionic and zwitterionic surfactants, such as e.g. fatty acid esters of polyalkoxylated sorbitans.

The present invention further relates to a thrombin solution (for preparing a fibrin sealant), comprising (preferably human) thrombin, pharmaceutically acceptable additives and water. Preferably, the thrombin activity of this solution decreases at most by 15%, preferably at most by 12.5%, more preferably at most by 10%, even more preferably at most by 7.5%, especially at most by 5% after storing the solution at 25° C. for 14 days. Alternatively, or in addition thereto, the thrombin activity preferably decreases at most by 25%, preferably at most by 20%, more preferably at most by 17.5%, even more preferably at most by 15%, especially at most by 12.5% after storing the solution at 25° C. for 28 days.

Typical thrombin concentrations suitable for the present invention range between 100 IU/ml and 2000 IU/ml of (preferably human) thrombin. Preferably, the thrombin activity is more than 100 IU/ml, preferably the thrombin activity is more than 200 IU/ml, preferably more than 250 IU/ml, more preferably more than 300 IU/ml, even more preferably more than 350 IU/ml, yet even more preferably more than 375 IU/ml. In particular, the thrombin activity is less than 2000 IU/ml, more preferably less than 1500 IU/ml, even more preferably less than 1250 IU/ml, yet even more preferably less than 1000 IU/ml, especially less than 800 IU/ml or even less than 700 IU/ml.

Thrombin activity of a thrombin-containing solution may be compared against the second international standard, which has by definition 110 IU/ampoule (Whitton et al, Thromb Haemost 2005; 93: 261-6). Many assays for analyzing thrombin activity are commercially available, including clotting based and chromogenic tests (Gaffney and Edgell, Thromb Haemost 1995; 74: 900-3).

In the course of the present invention, guanidine turned out as one of the additives which reduced the thrombin activity loss caused by prolonged non-refrigerated storage. Thus, according to a preferred embodiment, the pharmaceutically acceptable additives of the thrombin solution comprise guanidine (e.g. guanidine-HCl). Preferably, the guanidine concentration in the solution is more than 1 mM, preferably more than 5 mM, more preferably more than 10 mM, even more preferably more than 15 mM, especially more than 20 mM. It was found that, under certain circumstances, higher guanidine concentrations lead to suboptimal clot formation. Accordingly, it is preferred that the guanidine concentration in the solution is less than 250 mM, preferably less than 200 mM, more preferably less than 175 mM, even more preferably less than 150 mM, especially less than 125 mM or even less than 100 mM. In this connection, it surprisingly turned out that the guanidine in the thrombin solution also reduced viscosity and/or improved handling of a fibrin sealant obtained by combining the thrombin solution with a fibrinogen solution, such as a fibrinogen solution comprising (human) fibrinogen at a concentration of at least 40 mg/ml or at least 50 mg/ml, preferably at least 60 mg/ml, especially at least 65 mg/ml (in particular, the solution comprises fibrinogen at a concentration of at most 150 mg/ml, preferably at most 140 mg/ml, even more preferably at most 130 mg/ml, yet even more preferably at most 120 mg/ml, especially at most 110 mg/ml), even if the fibrinogen solution itself did not comprise guanidine. In embodiments, this fibrinogen solution (as a component of the fibrin sealant) may contain any of the additives disclosed herein, in particular at any of the concentrations disclosed herein.

According to a further preferred embodiment, the pharmaceutically acceptable additives comprise a cyclodextrin, preferably a beta-cyclodextrin, more preferably a hydroxypropyl beta-cyclodextrin or a sulfobutyl ether beta-cyclodextrin, in particular a sulfobutyl ether beta-cyclodextrin; preferably wherein the cyclodextrin concentration in the solution is more than 0.1 mM, preferably more than 0.5 mM, more preferably more than 1 mM, even more preferably more than 2.5 mM, especially more than 5 mM; in particular wherein the cyclodextrin concentration in the solution is less than 100 mM, preferably less than 75 mM, more preferably less than 50 mM, even more preferably less than 40 mM, especially less than 30 mM. Exemplary cyclodextrins suitable for the present invention include KLEPTOSE® HPB Biopharma (ROQUETTE) or CAPTISOL® (CyDex Pharmaceuticals).

It turned out that guanidine and cyclodextrin acted synergistically in reducing the thrombin activity loss caused by prolonged non-refrigerated storage. In yet another preferred embodiment, the pharmaceutically acceptable additives in the thrombin solution hence comprise both guanidine and a cyclodextrin (preferably a beta-cyclodextrin, more preferably a hydroxypropyl beta-cyclodextrin or a sulfobutyl ether beta-cyclodextrin, in particular a sulfobutyl ether beta-cyclodextrin). Preferably, the molar ratio between guanidine and cyclodextrin in the solution is between 20:1 and 1:4, preferably between 15:1 and 1:2, more preferably between 10:1 and 1:1.5, even more preferably between 5:1 and 1:1.25, yet even more preferably between 2.5:1 and 1:1.10, especially between 1.05:1 and 1:1.05.

Another additive with beneficial effect on thrombin stability during prolonged non-refrigerated storage turned out to be histidine. Thus, in another preferred embodiment, the pharmaceutically acceptable additives of the thrombin solution comprise histidine. Preferably, the histidine concentration in the solution is more than 1 mM, preferably more than 5 mM, more preferably more than 10 mM, even more preferably more than 12.5 mM, yet even more preferably more than 15 mM, especially more than 17.5 mM. To avoid potential detrimental effects on clot formation, it is preferred that the histidine concentration in the solution is less than 100 mM, preferably less than 50 mM, more preferably less than 40 mM, even more preferably less than 30 mM, yet even more preferably less than 25 mM, especially less than 22.5 mM.

Yet another additive with beneficial effect on thrombin stability during prolonged non-refrigerated storage turned out to be methionine. Thus, in another preferred embodiment, the pharmaceutically acceptable additives of the thrombin solution comprise methionine. Preferably, the methionine concentration in the solution is more than 1 mM, preferably more than 2.5 mM, more preferably more than 5 mM, even more preferably more than 6 mM, yet even more preferably more than 7 mM, especially more than 8 mM or even more than 9 mM. To avoid potential detrimental effects on clot formation, it is preferred that the methionine concentration in the solution is less than 50 mM, preferably less than 25 mM, more preferably less than 20 mM, even more preferably less than 15 mM, yet even more preferably less than 13 mM, especially less than 12 mM or even less than 11 mM.

Yet another additive with beneficial effect on thrombin stability during prolonged non-refrigerated storage turned out to be glycine. Thus, in another preferred embodiment, the pharmaceutically acceptable additives of the thrombin solution comprise glycine. Preferably, the glycine concentration in the solution is more than 25 mM, preferably more than 50 mM, more preferably more than 75 mM, even more preferably more than 100 mM, yet even more preferably more than 125 mM, especially more than 150 mM or even more than 175 mM. To avoid potential detrimental effects on clot formation, it is preferred that the glycine concentration in the solution is less than 400 mM, preferably less than 350 mM, more preferably less than 325 mM, even more preferably less than 300 mM, yet even more preferably less than 275 mM, especially less than 250 mM or even less than 225 mM.

Yet another additive with beneficial effect on thrombin stability during prolonged non-refrigerated storage turned out to be alanine. Thus, in another preferred embodiment, the pharmaceutically acceptable additives of the thrombin solution comprise alanine. Preferably, the alanine concentration in the solution is more than 10 mM, preferably more than 25 mM, more preferably more than 50 mM, even more preferably more than 70 mM, yet even more preferably more than 75 mM, especially more than 80 mM. To avoid potential detrimental effects on clot formation, it is preferred that the alanine concentration in the solution is less than 200 mM, more preferably less than 175 mM, even more preferably less than 150 mM, yet even more preferably less than 130 mM, especially less than 120 mM or even less than 110 mM.

It turned out that the amino acids disclosed above (in particular histidine, glycine and methionine) acted synergistically with each other in reducing the thrombin activity loss caused by prolonged non-refrigerated storage. In yet another preferred embodiment, the pharmaceutically acceptable additives in the thrombin solution hence comprise at least two of these amino acids (in particular at least two of histidine, glycine and methionine), preferably all of these amino acids (in particular histidine, glycine and methionine). The respective amino acid is preferably present at a concentration disclosed for the respective amino acid above.

Trehalose turned also out as an additive with a beneficial effect in reducing the thrombin activity loss caused by prolonged non-refrigerated storage. Thus, in yet another preferred embodiment, the pharmaceutically acceptable additives comprise trehalose. Preferably, the trehalose concentration in the solution is more than 10 mM, preferably more than 20 mM, more preferably more than 30 mM, even more preferably more than 40 mM, especially more than 45 mM. However, it is preferred that the trehalose concentration in the solution is less than 100 mM, more preferably less than 90 mM, even more preferably less than 80 mM, yet even more preferably less than 70 mM, especially less than 60 mM.

Compared to certain thrombin solutions in the prior art, a pH change of the solution led to better results with regard to stability and clot formation. Preferably, the pH of the thrombin solution is 6.0-8.0, preferably 6.3-7.7, more preferably 6.5-7.5, even more preferably 6.8-7.4, yet even more preferably 6.9-7.3, especially 7.0-7.2 or even 7.1.

In the course of the present invention, thrombin solutions within a broad range of osmolalities were tested and the most suitable ranges were found. Thus, in a preferred embodiment, the osmolality of the solution is more than 300 mOsmol/kg, preferably more than 350 mOsmol/kg, more preferably more than 400 mOsmol/kg, even more preferably more than 450 mOsmol/kg, yet even more preferably more than 500 mOsmol/kg or even more than 550 mOsmol/kg, especially more than 600 mOsmol/kg or even more than 650 mOsmol/kg. It is however preferred when the osmolality of the solution is less than 900 mOsmol/kg, preferably less than 850 mOsmol/kg, more preferably less than 800 mOsmol/kg, even more preferably less than 750 mOsmol/kg, yet even more preferably less than 700 mOsmol/kg. Osmolality is preferably measured immediately after (first) thawing, i.e. before storing the solution in a liquid state e.g. for up to 30 days. The preferred method for measuring osmolality is by freezing point depression in an osmometer (e.g. Osmomat 030-D RS, Gonotec).

Further additives may be added to the inventive thrombin solution. For instance, the pharmaceutically acceptable additives comprise at least one of, preferably at least two of, especially all of: a calcium salt such as calcium chloride, albumin (in particular human serum albumin) and sodium chloride.

In an aspect of the present invention, a fibrin sealant kit, comprising at least a first container comprising a fibrinogen solution, and a second container comprising a thrombin solution, is provided. The fibrinogen solution is defined as set forth herein and/or the thrombin solution is defined as set forth herein.

In embodiments, the fibrin sealant kit comprises a fibrin sealant delivery device. This may be a syringe-type applicator that ejects tissue sealant directly onto the tissue. Examples of such applicators are shown in U.S. Pat. Nos. 4,846,405, 5,582,596, 5,665,067, 6,461,361 and 6,585,696, and PCT Publication No. WO 96/39212. Further examples of such applicators also are sold under the DUPLOJECT® trademark, which is marketed by Baxter Healthcare Corporation (USA).

In a preferred embodiment, the first container and/or the second container is a pre-filled syringe (i.e., in case of the first container, a syringe prefilled with the fibrinogen solution disclosed herein, and, in case of the second container, a syringe prefilled with the thrombin solution disclosed herein).

According to a further preferred embodiment, the first container and/or the second container is contained within a sterile package (e.g. within a sterile bag, e.g. within a sterile inner bag which in turn is within an outer bag). The first container and/or the second container may be kept in the sterile package while thawing and/or while storing the fibrinogen solution and the thrombin solution at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, e.g. for up to 30 days or for up to 42 days or for up to 50 days.

The kit may comprise further components, such as e.g. a package insert with instructions listing storage conditions such as storing the fibrinogen solution and the thrombin solution at a temperature of 10° C.-37° C., preferably of 15° C.-30° C., more preferably 18° C.-25° C. for up to 30 days or for up to 42 days or for up to 50 days.

In another aspect, the present invention relates to a method for preparing a fibrin sealant, comprising the steps of obtaining a fibrin sealant kit as defined herein, wherein the fibrinogen solution and the thrombin solution are in a frozen state, thawing the fibrinogen solution and the thrombin solution, storing the fibrinogen solution and the thrombin solution at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, (e.g. for up to 30 days or for up to 42 days or for up to 50 days) and, after the storing, combining (e.g. mixing) the fibrinogen solution and the thrombin solution to obtain the fibrin sealant.

The present invention also relates to a method for preparing a fibrin sealant, comprising the steps of obtaining a fibrin sealant kit as defined herein, wherein the fibrinogen solution and the thrombin solution are in a frozen state, thawing the fibrinogen solution in the first container and the thrombin solution in the second container, storing the fibrinogen solution in the first container and the thrombin solution in the second container at a temperature of 10° C.-37° C., preferably of 15° C.-30° C., more preferably 18° C.-25° C. for at least three days, preferably for at least four days, more preferably for at least five days, even more preferably for at least seven days, yet even more preferably for at least ten days, especially for at least fifteen days or even for at least twenty days, (e.g. for up to 30 days or for up to 42 days or for up to 50 days) and, after the storing, opening the sterile package containing the first container and/or the second container, after the opening, combining (e.g. mixing) the fibrinogen solution and the thrombin solution to obtain the fibrin sealant.

In yet another aspect, a method for treating a wound, especially a bleeding wound, or tissue comprising the step of applying a fibrin sealant obtained by a method disclosed herein to the wound or tissue, is provided.

Further, the present invention provides a method for treating a wound, especially a bleeding wound, or tissue comprising the steps of combining (e.g. mixing) a fibrinogen solution and a thrombin solution to obtain a fibrin sealant, wherein the fibrinogen solution is defined as set forth herein and/or wherein the thrombin solution is defined as set forth herein, and applying the fibrin sealant to the wound or tissue.

Finally, in yet another aspect, the present invention provides the fibrinogen solution disclosed herein and/or the thrombin solution disclosed herein for use in a method as disclosed herein.

The present invention is further illustrated by the following figures and examples, without being limited to these embodiments of the invention.

EXAMPLES

Example 1—Fibrinogen Solutions

Original starting point of this project (and the project described in example 2) were the commercially available TISSEEL fibrinogen and thrombin solutions (also called original formulations or OFs hereinafter):

Fibrinogen solution (sealer protein solution):
total protein: 96-125 mg/ml, fibrinogen (human): 67-106 mg/ml, factor XIII (human): 0.6-5 IU/ml, aprotinin (synthetic): 2250-3750 KIU/ml, human albumin; other ingredients: tri-sodium citrate, histidine, niacinamide, polysorbate 80 and water for injection Thrombin solution:
thrombin (human): 400-625 IU/ml, calcium chloride: 36-44 µmol/ml; other ingredients: human albumin, sodium chloride and water for injection.

An objective of this project was to reduce the viscosity of fibrinogen solutions by optimizing the formulation. The viscosity should be as low as possible, if tested at 20° C. after storage for 30 days at 20° C. while maintaining an opaque clot.

To fulfil the objective, viscosity of the formulations was measured at 15° C., 20° C. and 37° C. Also clot formation by absorption at 633 nm after mixing with the following two thrombin solutions of the present invention (thrombin activity: 400-625 IU/ml) was analysed:

|  | PEO64_0 | |
| --- | --- | --- |
| Excipient | T_WP6_01 g/l | T_WP6_04 g/l |
| Glycin | 15.00 | 15.00 |
| Histidine | 3.10 | 3.10 |
| Methionine | 1.50 | 1.50 |
| Gua-HCl | 9.60 | 2.40 |
| Kleptose HBP | 8.69 | 34.75 |
| NaCl | 4.50 | 4.50 |
| CaCl$_2$ Dihydrate | 5.88 | 5.88 |
| pH | 7.3 | 7.3 |

Liquid formulations, comprising additives within the defined design space were produced, tested and iteratively optimized in the course of two screening rounds. The best-performing formulations from these screening rounds were selected and were tested together with the original formulation in a stability study after storage for 30 days at 20° C.

Best performing formulations (additives in addition to original formulation listed; concentrations are total concentrations in the solution):

| formulation | pH | Arg g/l | His g/l | Gua-HCl g/l | NaCl g/l |
| --- | --- | --- | --- | --- | --- |
| 2 | 7.2 | 2.50 | 18.00 | 1.20 | 2.10 |
| 3 | 7.2 | 0.63 | 20.00 | 1.80 | 3.15 |

Remarkable improvements of fibrinogen formulations were achieved. The best performing formulations showed much reduced increase in viscosity after 30 days storage at 20° C. when compared with the original formulation:

Dynamic Viscosity [mPa*s] increase [%] at 15° C., 20° C. and 37° C. of TISSEEL fibrinogen in F_PEO64_1_WP3_01-05 and OF at 0d and after 30 d at 20° C.; tables show mean value from 1 biol. replicate measured as 6 technical replicates; OF: original formulation replicates with 6 technical replicates each.

| PEO64_1_WP3 | 15 C. 30d 20C |
| --- | --- |
| OF | +44% |
| 2 | +15% |
| 3 | +6% |

| PEO64_1_WP3_ | 20 C. 30d 20C |
| --- | --- |
| OF | +39% |
| 2 | +16% |
| 3 | +10% |

| PEO64_1_WP3_ | 37 C. 30d 20C |
| --- | --- |
| OF | +38% |
| 2 | +19% |
| 3 | +13% |

Viscosity of formulated fibrinogen samples was measured with a falling ball viscometer (Microviscometer Lovis 2000 ME, Anton Paar) at 15° C., 20° C. and 37° C. with Lovis 1.8 mm glass capillary. Temperature was held constant for 5 min before measurement. The falling time was averaged from six individual measurements at an angle of 70° of the capillary. The dynamic viscosity of the respective samples was calculated based on the known density of the steel ball and the measured sample density as well as the characteristics of the capillary.

Samples were pre-warmed for 5 min at 37° C. before transferring them to the capillary. Sample density was measured with Gay-Lussac Pycnometer (Carl Roth) and a sample volume of 1.103 ml at RT. The pycnometer was weighed using an analytical balance (SECURA 124-1S, Sartorius).

Figure 1:
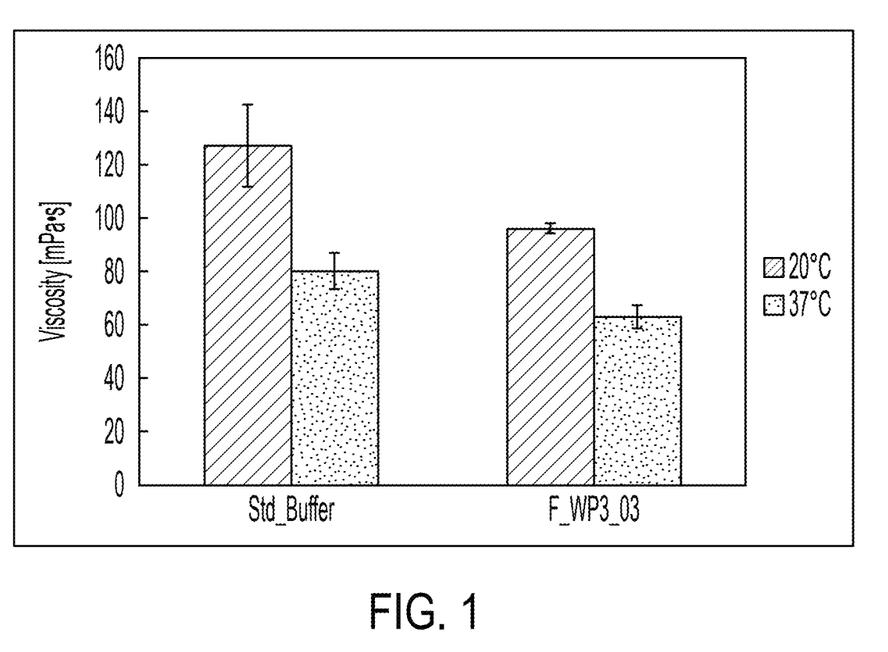
FIG. 1 is a graph illustrating low dynamic viscosity before storage for a standard buffer formulation and for a formulation in accordance with the present invention at 20° C. and 37° C.

Further viscosity tests also confirmed low dynamic viscosity before storage, when compared to the original formulation as shown in FIG. 1.

Determination of osmolality was performed by freezing point depression in an osmometer (Osmomat 3000 D-M, Gonotec). Each measurement was performed in 15 µl aliquots after calibration with sodium chloride standard (600 mOsmol/kg) and purified water. The used calibration range is bracketing the actual range of formulation osmolalities:

|  | Measured osmolality w/o Fib [mOsmol/kg] | | Measured osmolality w/Fib [mOsmol/kg] | |
| --- | --- | --- | --- | --- |
|  | Mean | SD | Mean | SD |
| 2 | 143 | 1 | 442 | 17 |
| 3 | 188 | 1 | 481 | 18 |
| OF | — | — | 292 | 0 |

The optimized fibrinogen formulations from PEO64_1 in WP3 showed faster clotting in comparison to solutions developed earlier during the screen with both thrombin formulations used (T_WP6_01 and T_WP6_04). Clotting performance was entirely satisfactory.

Furthermore, the concentration of additives could be drastically reduced in comparison to solutions developed earlier during the screen, while activity of fibrinogen during storage at 20° C. could be maintained.

Example 2—Thrombin Solutions

The aim was to optimize the commercially available thrombin formulation disclosed in example 1 (also called original formulation or OF). This liquid formulation should be provided frozen to the customer, but should also be stable in thawed state for a certain period of time. In particular, the optimized liquid formulation of thrombin should be stable for 28 days at 25° C.

Additives showing positive effects in the accelerated aging rounds were further investigated for optimal concentrations and component balance in real time storage rounds for up to 90 days at 5° C., 25° C. and 30° C. and up to 42 days at 15° C., 25° C. and 30° C. in further screening rounds.

Figure 3A:
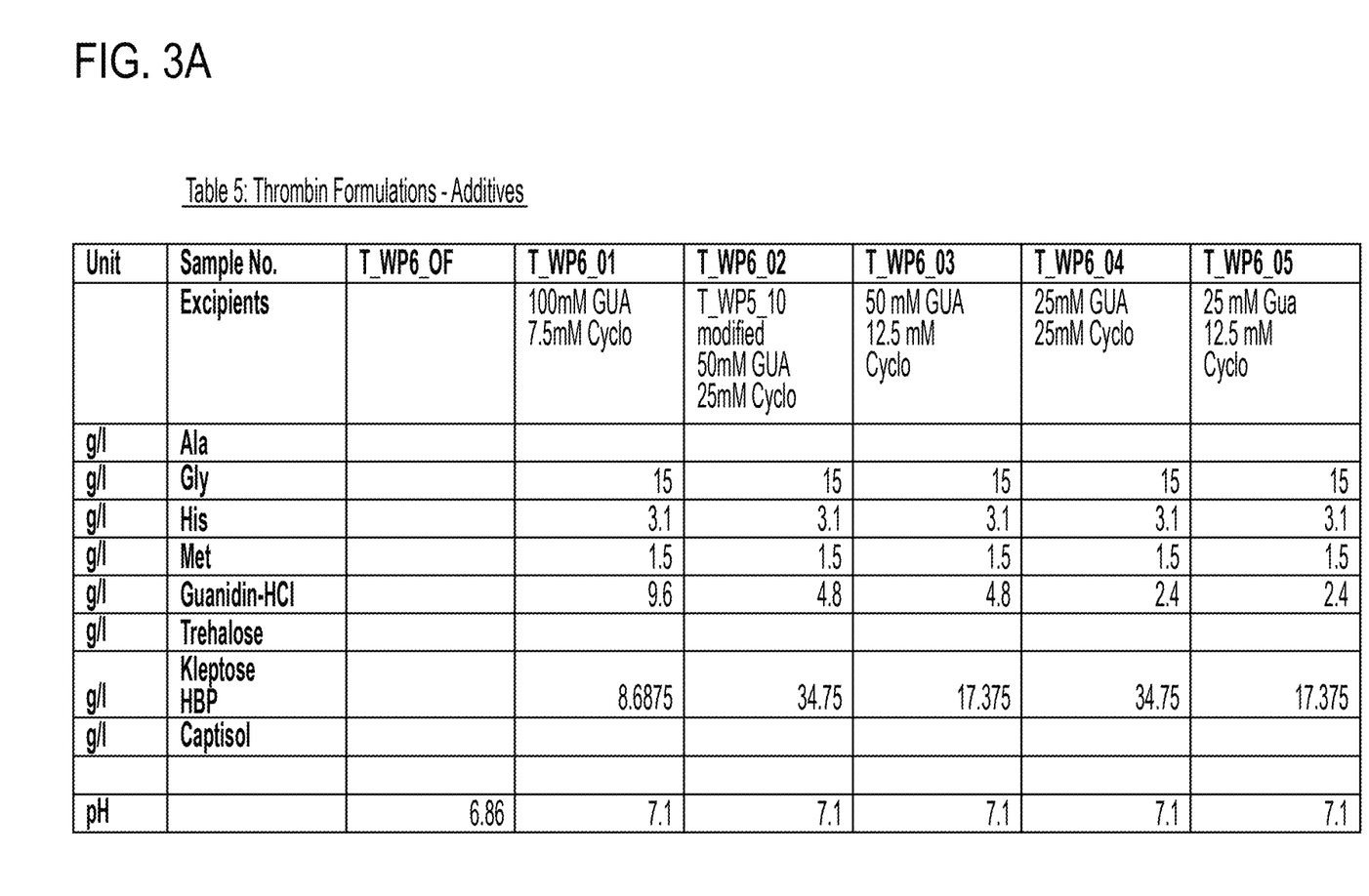
FIGS. 3A and 3B are a TABLE 5: Thrombin Formulations—Additives.
Figure 3B:
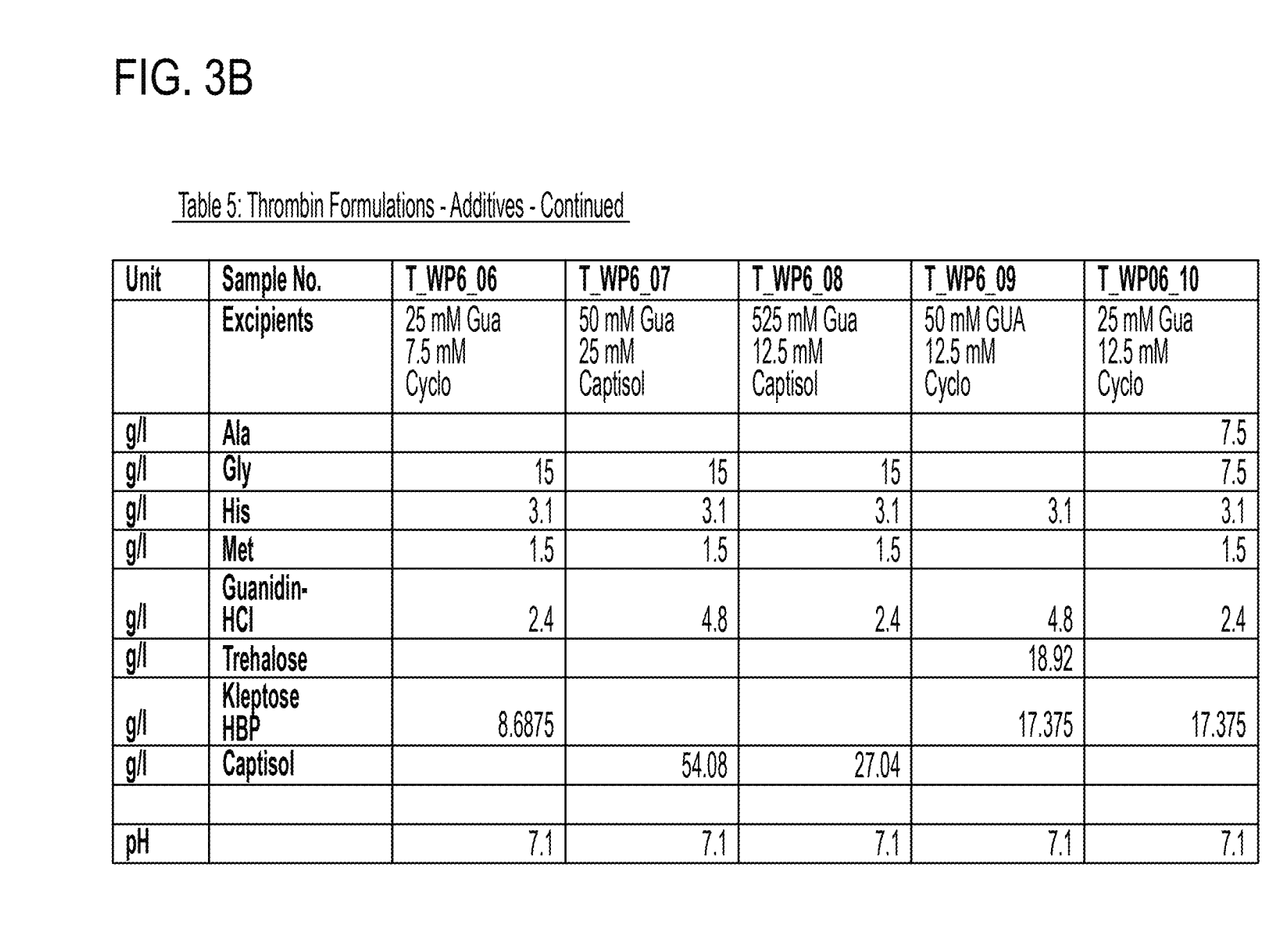

Additives used in the final screening round (T_WTP6_OF: original formulation): are shown in Table 5 of FIGS. 3A and 3B.

Determination of Thrombin Activity

Figure 2:
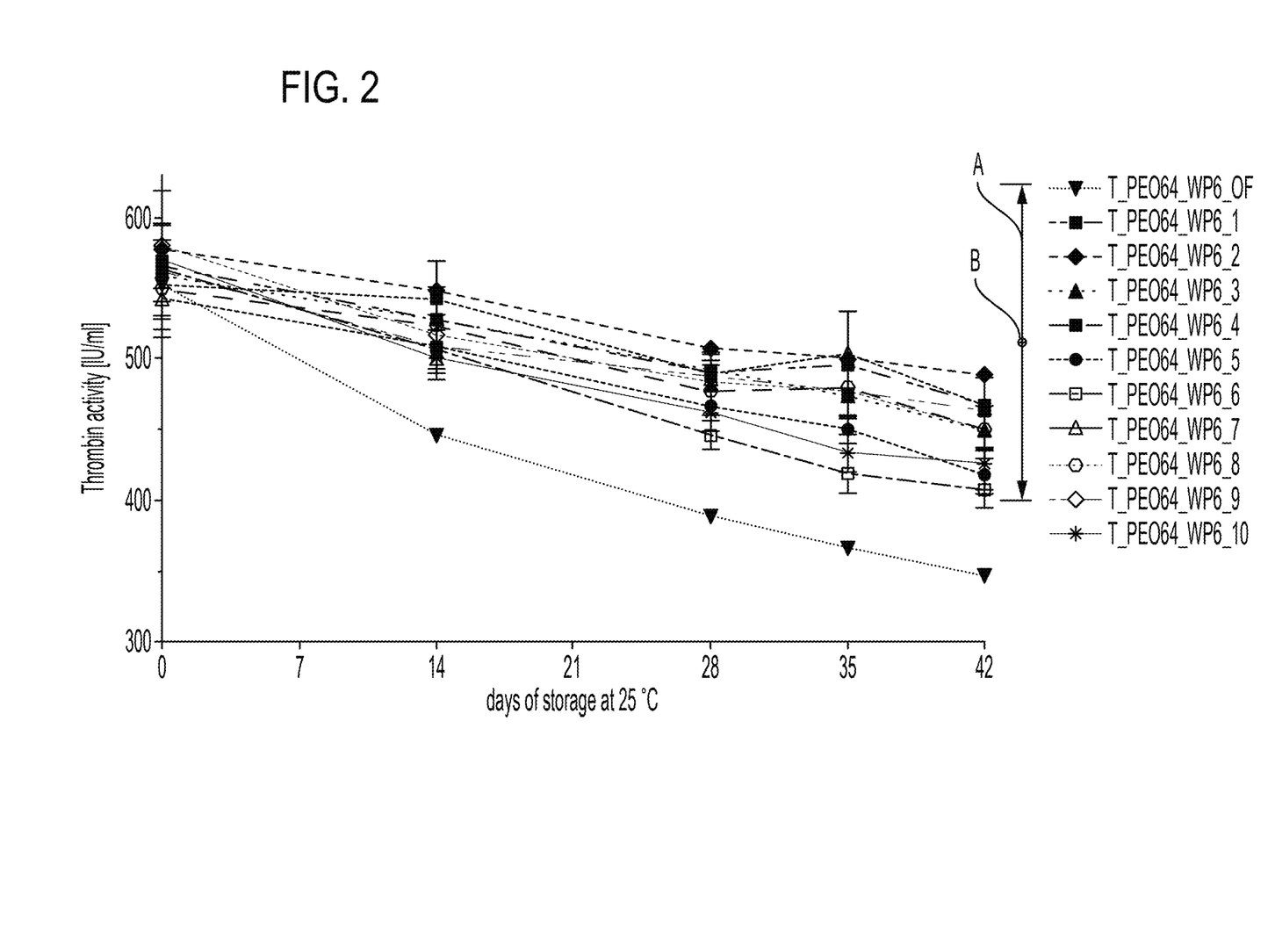
FIG. 2 is a graph illustrating the thrombin activity ranges for optimized formulations of the present invention compared to a commercially available thrombin formulation (original formulation) as a function of days in storage at 25° C., wherein arrow A shows the range of acceptable thrombin activities or acceptance criteria, i.e., a thrombin activity of 400-625 IU/ml and Point B shows the activity of the sourced thrombin used in WP6 according to a Certificate of Analysis.

All optimized formulations were within the specification of 400 to 625 IU/ml after storage at 25° C. for up to 42 days. By contrast, the original formulation T_PEO64_WP6_OF showed a constant decrease over time and temperature. This is shown in FIG. 2.

Figure 4A:
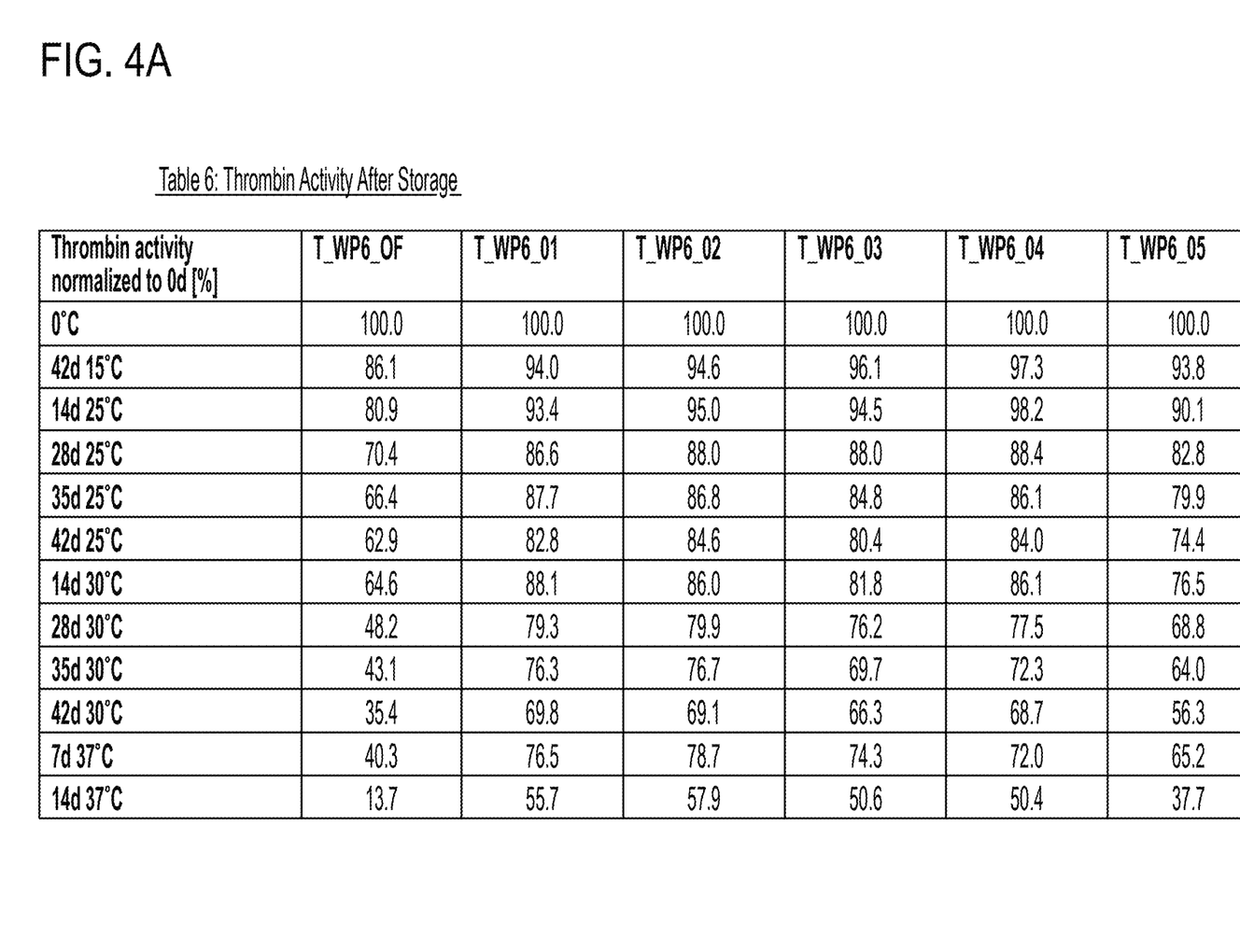
FIGS. 4A and 4B are a TABLE 6: Thrombin Activity After Storage at Various Times and Temperatures.
Figure 4B:
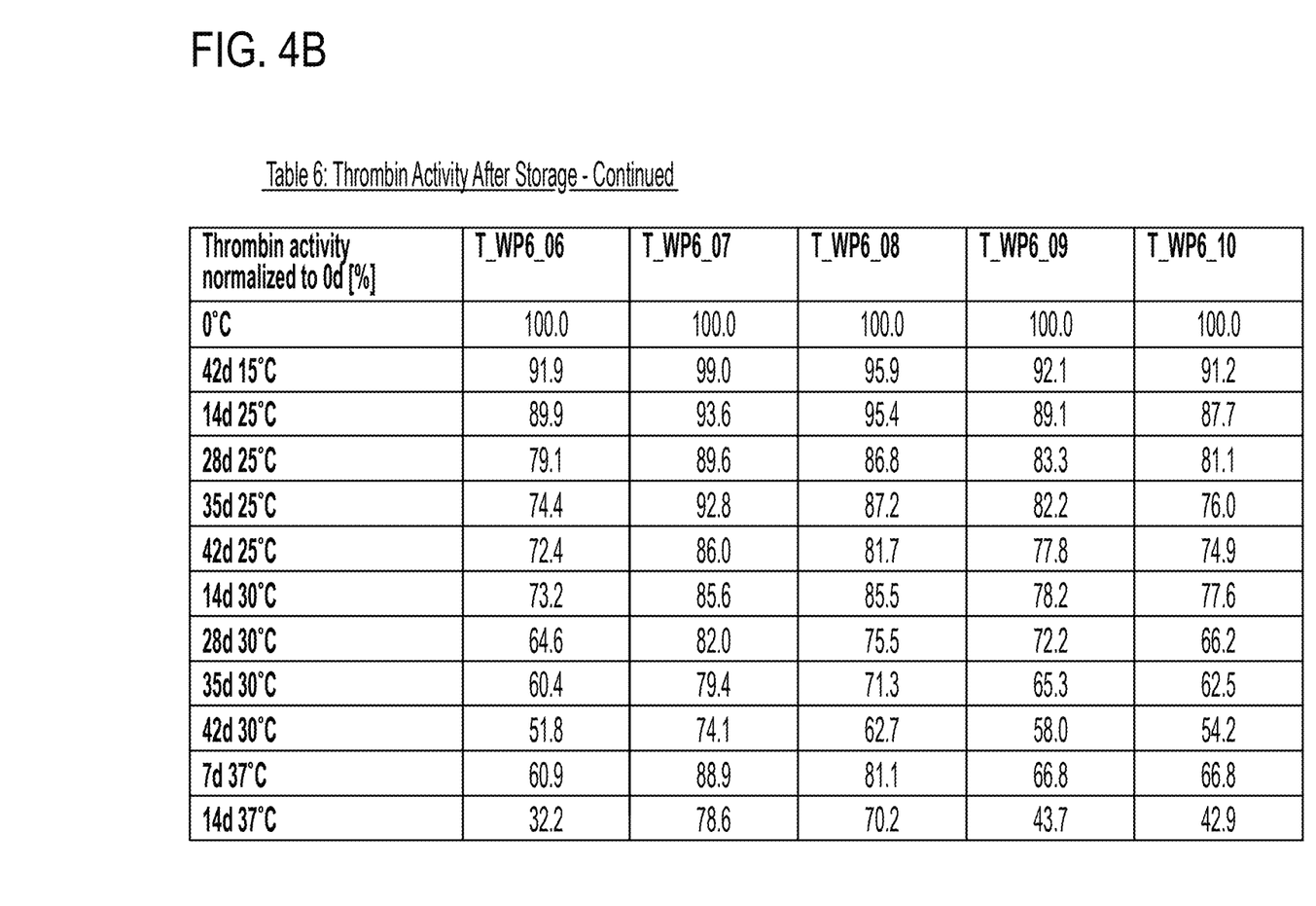

FIGS. 4A and 4B show the remaining thrombin activity over time as compared to day 0 (100%) in Table 6.

Determination of Osmolality

TABLE 7

Measured osmolality of T_PEO64_WP6_1 and T_PEO64_WP6 w/o and w/ thrombin.

| Formulations | Measured osmolality w/o Thrombin [mOsmol/kg] | | Measured osmolality w/Thrombin [mOsmol/kg] | |
|---|---|---|---|---|
| | Mean | SD | Mean | SD |
| T_PEO64_WP6_1 | 518 | 3.5 | 697 | 1.4 |
| T_PEO64_WP6_2 | 466 | 0.0 | 660 | 2.8 |
| T_PEO64_WP6_3 | 434 | 0.7 | 620 | 17.7 |
| T_PEO64_WP6_4 | 412 | 2.8 | 603 | 3.5 |
| T_PEO64_WP6_5 | 393 | 0.0 | 567 | 12.7 |
| T_PEO64_WP6_6 | 386 | 2.8 | 553 | 7.1 |
| T_PEO64_WP6_7 | 646 | 12.0 | 847 | 0.7 |
| T_PEO64_WP6_8 | 480 | 0.0 | 673 | 2.1 |
| T_PEO64_WP6_9 | 298 | 0.0 | 478 | 2.8 |
| T_PEO64_WP6_10 | 382 | 7.1 | 564 | 0.7 |
| T_PEO64_WP6_OF | 111 | 0.7 | 279 | 5.7 |

Osmolality was measured as described in example 1.

Turbidity of optimized thrombin formulation indicated no relevant differences over storage time and temperature. All values were in a very low range for turbidity (<10 Nephelometric Turbidity Units). Color and clarity of formulated thrombin indicated no relevant differences over 42 days of storage. All samples were clear and showed a slight greenish to brownish yellow, i.e., a color typical for thrombin formulations.

Fibrin clot performance when combined with fibrinogen solutions after storage was entirely satisfactory.

In conclusion, all optimized thrombin formulations used in the final stability study showed an excellent result of thrombin activity within the specification (400-625 IU/ml) after 42 days at 25° C.

Example 3—Fibrin Sealant Kit

The following fibrinogen and thrombin solutions were selected from example 1 and 2 as the best combination as these also fulfilled further objectives, such as opaque whitish clot color, low osmolality, and short clotting time (additives in addition to original formulations listed above in Example 1; concentrations are total concentrations in the solution):

TABLE 8

KIT FIBRINOGEN AND THROMBIN SOLUTION FORMULATIONS

| Unit | Additives | T_WP6_01 PEO64_0 | F_WP3_03 PEO64_1 |
|---|---|---|---|
| g/l | Arg | | 0.63 |
| g/l | Gly | 15.00 | |
| g/l | His | 3.10 | 20.0 |
| g/l | Met | 1.50 | |
| g/l | Guanidin-HCl | 9.60 | 1.80 |
| g/l | Kleptose HBP | 8.688 | |
| g/l | NaCl | | 3.15 |
| | pH | 7.1 | |

A fibrin sealant kit is provided with a first syringe prefilled with fibrinogen solution F_WP3_03/PEO64_1 and a second syringe prefilled with thrombin solution T_WP6_01/PE64_0. The entire kit is provided frozen at −25° C. The solutions are thawed two weeks before surgery and kept at 20° C.-25° C. before being used to prepare the fibrin sealant by mixing during surgery.

The invention claimed is:

1. A fibrinogen solution consisting essentially of:
    67-106 mg/ml human fibrinogen,
    0.6-5 mg/ml human Factor XIII,
    2250-3750 KIU/ml synthetic aprotinin,
    0.63 g/l arginine,
    20.00 g/l histidine,
    1.80 g/l guanidine—HCl, and
    3.15 g/l NaCl,
    wherein the fibrinogen solution comprises a total protein concentration of 96-125 mg/ml and an osmolality of 481 mOsmol/kg.

2. The fibrinogen solution of claim 1, having an initial dynamic viscosity of the fibrinogen solution at 20° C. of less than 120 mPa·s.

3. The fibrinogen solution of claim 2, wherein a dynamic viscosity of the fibrinogen solution measured at 20° C. increases at most by 25% over the initial dynamic viscosity after storing the fibrinogen solution at 20° C. for 30 days.

4. A room temperature storage stable thrombin solution consisting essentially of:
    400-625 IU/ml thrombin,
    36-44 μmol/ml CaCl$_2$,
    15 g/l glycine,
    3.1 g/I histidine,
    1.5 g/I methionine,
    9.6 g/I guanidine—HCl, and
    8.6875 g/I cyclodextrin,
    said thrombin solution comprises a pH of 7.1.

5. The thrombin solution of claim 4, wherein the thrombin solution retains at least 76.3% thrombin activity after storage for 35 days at 30° C.

6. A fibrin sealant comprising the fibrinogen solution of claim 1 and the thrombin solution of claim 4.

7. A fibrin sealant kit comprising at least:
a first container comprising the fibrinogen solution of claim 1; and
a second container comprising the thrombin solution of claim 4.

8. The fibrin sealant kit of claim 7, wherein the kit further comprises a fibrin sealant delivery device.

9. The fibrin sealant kit of claim 7, wherein the first container and the second container are pre-filled syringes.

10. The fibrin sealant kit of claim 7, wherein the first container and second container are in a sterile package.

11. A method for treating a wound, a bleeding wound, or tissue comprising a step of applying a fibrin sealant of claim 6.

12. A method for preparing a fibrin sealant, comprising the steps of
   (I) obtaining a fibrin sealant kit comprising at least:
      a first container comprising the fibrinogen solution of claim 1; and
      a second container comprising the thrombin solution of claim 4, wherein the fibrinogen solution and the thrombin solution are in a frozen state,
   (II) thawing the fibrinogen solution and the thrombin solution,
   (III) storing the fibrinogen solution and the thrombin solution at a temperature of 18° C.-25° C. for at least three days, and
   (IV) combining the fibrinogen solution and the thrombin solution to obtain the fibrin sealant.

13. A method for treating a wound, a bleeding wound, or tissue comprising the step of applying a fibrin sealant of claim 12 to the wound, bleeding wound or tissue.

14. A method for preparing a fibrin sealant, comprising the steps of
   I) obtaining a first container comprising a lyophilized fibrinogen solution of claim 1 and a second container including a lyophilized thrombin solution of claim 4;
   (II) reconstituting, by adding water or an aqueous solution, to the first container to obtain a reconstituted fibrinogen solution, and to the second container to obtain a reconstituted thrombin solution;
   (III) storing the reconstituted fibrinogen solution and the reconstituted thrombin solution at a temperature of 15° C.-30° C., for at least three days; and
   (IV) combining the reconstituted fibrinogen solution and the reconstituted thrombin solution to obtain the fibrin sealant.

15. A method for treating a wound, a bleeding wound, or tissue comprising the steps of
   (I) combining a fibrinogen solution of claim 1 and a thrombin solution of claim 4 to obtain a fibrin sealant, and
   (II) applying the fibrin sealant to the wound, bleeding wound or tissue.

* * * * *